Jan. 27, 1959  F. M. MAYES  2,870,541
TUBING CALIPER

Filed Nov. 9, 1955  2 Sheets-Sheet 1

INVENTOR.
FRED M. MAYES
BY
ATTORNEYS

Jan. 27, 1959 F. M. MAYES 2,870,541
TUBING CALIPER
Filed Nov. 9, 1955 2 Sheets-Sheet 2

INVENTOR.
FRED M. MAYES
BY Busser, Smith & Harding
ATTORNEYS

United States Patent Office 2,870,541
Patented Jan. 27, 1959

2,870,541

TUBING CALIPER

Fred M. Mayes, Newtown Square, Pa., assignor to Sun Oil Company, Philadelphia, Pa., a corporation of New Jersey Application November 9, 1955, Serial No. 545,963

19 Claims. (Cl. 33—178)

This invention relates to a device for simultaneously calipering and recording accurately the interior surface conditions of pipes, tubes, and like conduits.

Devices of this general type are well known and have gone into extensive use. Heretofore, such devices of practical types have been mechanical in operation, particularly since under the acceptable conditions of operation recording must be accomplished locally in the device itself, it being impractical to transmit signals to surface recording apparatus.

The general considerations involved in such a device need not be set forth herein since they are fully discussed in the patent to John V. Fredd, No. 2,637,117, dated May 5, 1953, which discusses a typical mechanical calipering device of the type just indicated.

A disadvantage of the mechanical recording type of calipering device is that between the probing fingers and a recording stylus relatively massive members are used, and in order to obtain fast response of the stylus at the high logging speeds desirably employed, stiff springs must be used to push the probing fingers against the tubing wall.

In accordance with the present invention the probing element may be of electrical type and never in actual mechanical contact with the tubing walls. However, as will appear, the invention is also applicable to a device in which contact members actually engage the tubing walls, but the forces involved in such an engagement may be very slight so that light springs may be used and high rapidity of indication for recording effected. In any case there is eliminated any necessity for conductive cable connection to the surface, the apparatus being battery operated.

One of the limitations on the mechanical type of calipering and recording device has been that of limitation on the total length of tubing which may be examined with one pass of the caliper. This limitation is imposed by reason of the necessity of a lead screw and recording chart, any increase of the length of the record involving added inertial mass and consequently still stiffer springs. In accordance with the present invention the logging capacity is practically unlimited since recording may be accomplished on a magnetic tape or the like having complete mechanical independence of the sensing means.

The present invention may be utilized in conjunction with recording devices such as are involved in my application Serial No. 514,061, filed June 8, 1955, now Patent No. 2,799,946, issued July 23, 1957.

The objects of the invention relate to the securing of the advantageous results above indicated both individually and in combination. These together with detailed objects relating to matters of preferred construction and operation will become apparent from the following description read in conjunction with the accompanying drawings in which.

Figures 1, 3, 4:
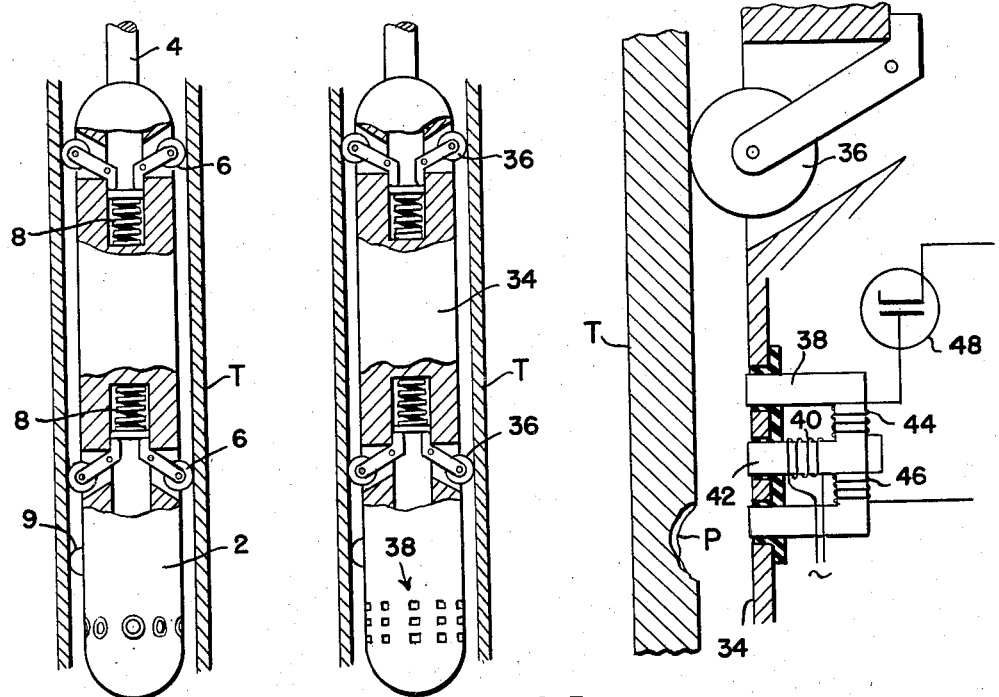
Figure 1 is an elevation partly in section, showing one form of the calipering device provided in accordance with the invention.
Figure 3 is a view similar to Figure 1 but showing an alternative form of the device.
Figure 4 is an enlarged sectional and diagrammatic view showing in particular the sensing means involved in the apparatus of Figure 3.
Figure 2:
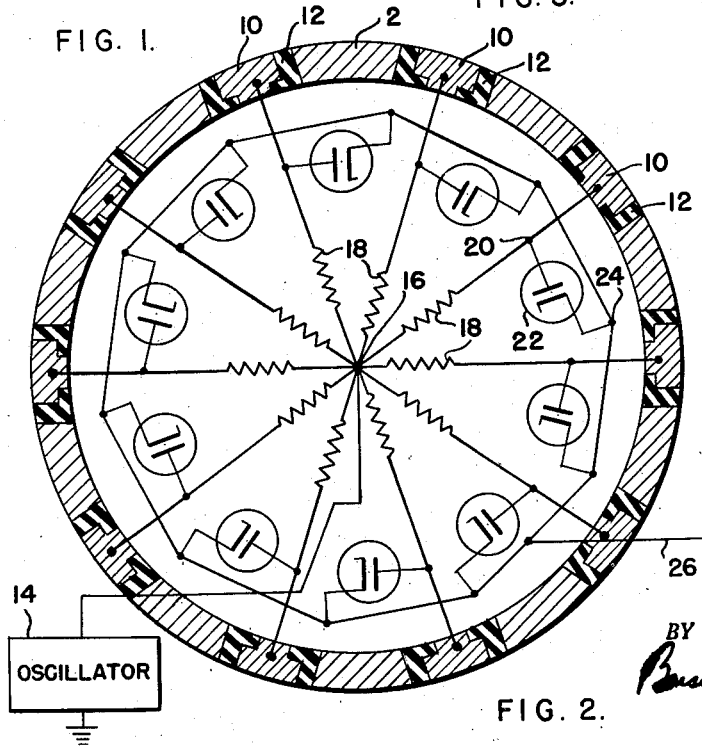
Figure 2 is a radial cross section showing in particular the sensing elements and their electrical connections, the electrical elements being indicated diagrammatically.

Referring first to the modification illustrated in Figures 1 and 2, there is indicated at T a portion of a tube which is being calipered. The calipering device comprises a housing 2 within which is contained the sensing elements, their electrical connections, and suitable recording means. The housing is maintained in axial alignment with the tubing T by means of rollers 6 carried by pivoted levers acted upon by strong springs 8. Indicated at 9 is a roller following the wall of the tubing and adapted to drive a recording chart, in the form of a film, magnetic tape, foil arrangement or the like, on which the indications of pits in the tubing are recorded.

In the modification under discussion, sensing is provided involving, effectively, the measurement of variable capacitances. For this purpose conductive elements 10 are provided mounted in insulating bushings 12 in the housing 2, the mounting arrangements being such as to sustain such pressures as may be involved and provide an enclosure within which the electrical and other recording elements are housed. Each of the elements 10 is connected through an individual resistor 18 to a common terminal 16 which is connected to the ungrounded output terminal of an oscillator 14 supplying an alternating current desirably at a rather high frequency of the order of a low radio frequency. It will be evident, however, that the excitation supplied by the oscillator may range through a very wide band of frequencies. However, since small capacities are involved in the measurement a quite high frequency is desirable. The resistors 18 are of equal resistance values, and the connection between each resistor and its corresponding element 10 is connected as indicated at 20 to the anode of a diode 22. The cathodes of these diodes are connected to a common conductor 26 at 24 which serves to feed the ungrounded terminal of a capacitor 28 shunted by a suitable resistance 30 for attainment of a desired time constant. Leads 32 from the capacitor terminals are arranged to feed an amplifier and recorder.

In the operation of the apparatus described, each of the elements 10 forms one plate of a capacitance with respect to the tubing wall T which is at ground potential. If a pit in the tubing is opposite one of the elements 10, the capacitance existing between it and the tubing will be a minimum so that the reactance will be a maximum. Accordingly, assuming that one of the elements 10 is opposite a pit, or if several are opposite pits but a particular element 10 is opposite the deepest pit, the alternating potential appearing at the anode of its associated diode will be maximum as compared with the potentials at the anodes of the other diodes of the complete set. It will be evident, therefore, that there will appear at the ungrounded terminal of capacitor 28 a direct potential, due to rectification, which corresponds to the reactance of that capacitance provided by the element 10 which is most removed from the tubing wall by reason of the presence of a pit, only its diode conducting, the others being cut off since their anodes will be negative with respect to their cathodes. In other words, the capacitor 28 will be charged to a direct positive potential corresponding to the maximum potential appearing at the outer ends of the resistors 18. In the traversal of the tubing, therefore, the direct potential on capacitor 28 will vary in direct relationship to the depth of the pits which may appear successively opposite the various elements 10, the pits being obviously indicated irrespective of where they occur about the tubing and the calipering device. The number of elements 10 is so chosen so as to give indications of pits of such size as would be of interest, and for this purpose a greater or less number of elements 10 may be provided. Of course, in the case of large pits, a number of elements 10 may simultaneously be opposite a single pit. In any event the presence of a pit will be indicated by an abonrmal increase of direct potential on the capacitor 28. The capacitance of capacitor 28 and resistance of resistor 30 are so chosen that, taking into account the speed of traversal of the tubing, the charge on the capacitor will vary at a sufficient rate to indicate pits which are closely spaced.

The type of amplifier and recorder fed by the means 32 is subject to quite arbitrary choice, and reference may be made to my application referred to above for one form of recording device which may be utilized for securing magnetic records on a magnetic tape. In such case the direct potential 32 may be used to change the frequency of an oscillator in well known fashion, so that the recorder may be analyzed through the use of a frequency discriminator as described in said application. To provide a standard, a fixed frequency oscillator may also record on the same tape so as to take into account variations in recording speed as described in said application. The tape will, of course, be driven through a tubing contact wheel such as 9.

Alternatively the direct potential, after amplification, may be recorded on a moving paper chart through the use of a conventional recording meter; or photographic recording may be effected; or a stylus may mark a metal foil recording member in the same general fashion as described in said Fredd patent, the stylus being electromechanically driven in accordance with the output signal appearing at 32. The particular recording means used forms no part of the present invention and accordingly is not described in detail, the recording being possible in many fashions well known to the art, including those just outlined.

Figures 5, 6, 7, 8, 9:
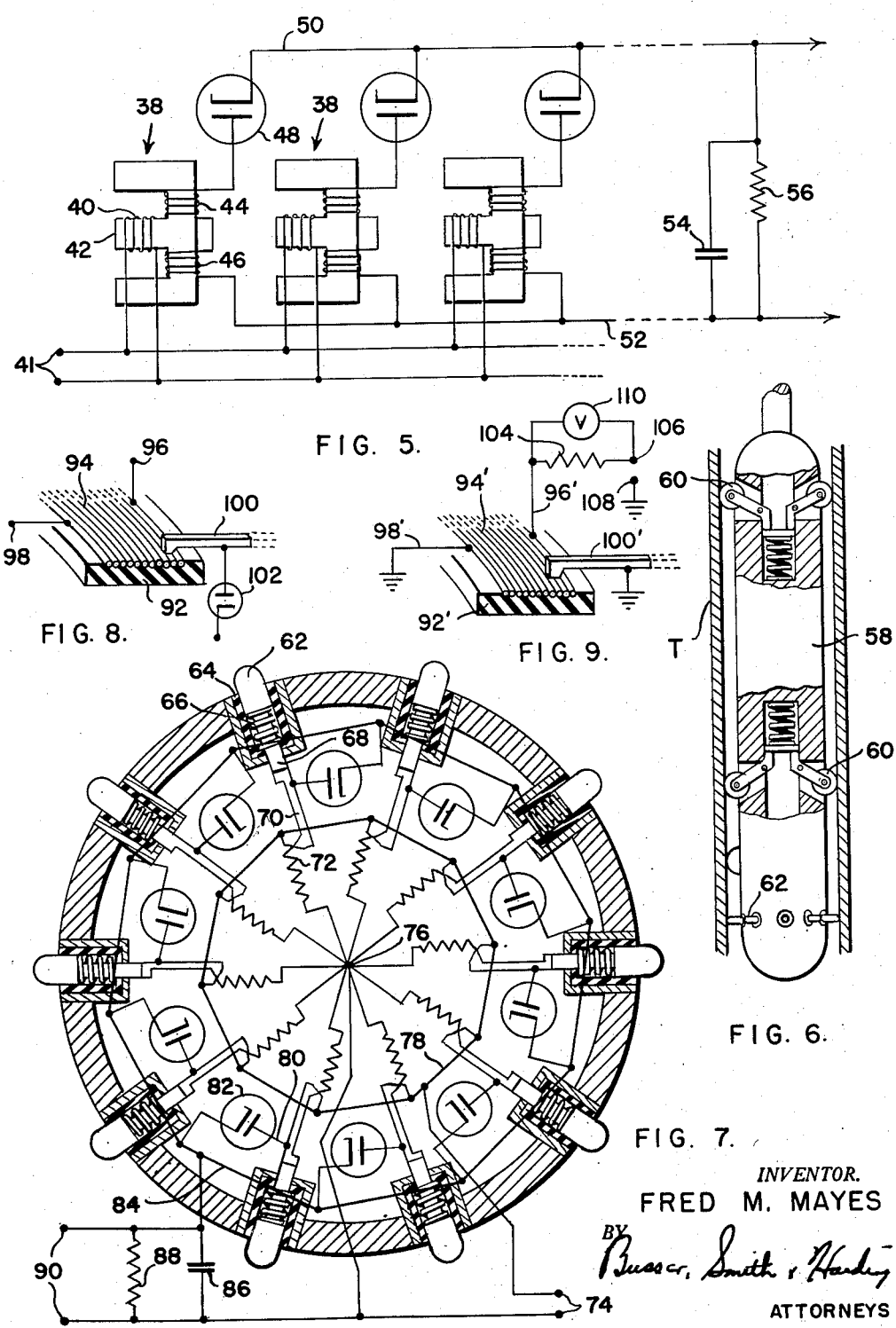
Figure 5 is a wiring diagram showing the electrical connections involved in the apparatus of Figure 3.
Figure 6 is a view similar to Figures 1 and 3 but showing still another modification of the invention.
Figure 7 is a sectional and diagrammatic view showing mechanical and electrical elements of the apparatus indicated in Figure 6.
Figure 8 is a fragmentary sectional perspective view showing an alternative mechanical arrangement which may be used in conjunction with the type of sensing and recording means indicated in Figure 7.
Figure 9 is a fragmentary sectional perspective view showing a further modification of the invention.

Figures 3, 4 and 5 show another type of apparatus but involving an electromagnetic type of pickup. In this case the housing 34 is provided with centering rollers 36, and sensing means 38 are provided, each in the form of an electromagnetic device desirably consisting of an E coil comprising an exciting winding 40 on its middle leg and a pair of windings 44 and 46 arranged symmetrically with respect to the middle leg 42 and so wound as to provide opposition of their outputs which are in series, giving consideration to what may be considered normal symmetry about the axis of leg 42 of the magnetic circuit involved. Associated with each of the pickup devices 38 is a diode 48 which, as illustrated in Figure 5, has its anode connected to one terminal of the series coils 44 and 46, the cathodes of the diodes being connected together and to one terminal of a capacitor 54, the other terminal of which is connected to the common connection 52 of the other ends of the series coils. As in the previous modification, capacitor 54 is shunted by a resistor 56 to provide a desired time constant. The coils 40 are excited in parallel from terminals 41 which may be energized by an oscillator such as 14 though in this case the frequency used will normally be relatively low in the audio frequency range.

Considering a single pickup unit 38, it will be evident that so long as it is opposite an unpitted portion of the tubing T symmetry is involved with a net zero or substantially zero output from the series arrangement of the coils 44 and 46, these coils being assumed equal. However, if a pit is encountered as the apparatus is moving in a particular direction, there will be imposed on the anode of the corresponding diode 48 a signal as the pit is approached, the signal then dropping off as the pit is symmetrically disposed with respect to the pickup element, and again rising as the pickup element departs from the pit. The result is the production of a double peaked output from the standpoint of amplitude from each pit encountered, and this is rectified by the corresponding diode 48 to provide a direct output correspondingly consisting of a pair of peaks. Due to the presence of the diodes, it will be evident that the capacitor 54 will acquire a positive potential at its upper side indicated in Figure 5 corresponding to the presence of the deepest pit which may be simultaneously encountered by the various pickup elements, or by a single pit encountered by one of them if, opposite the others, the tubing wall is unpitted. The operation of detecting the maximum depth pit is essentially that of the modification previously described, and the resulting varying direct potential may be recorded in one of the fashions indicated above.

It may be here noted that while the diagrams in several figures indicate thermionic diodes, there may be used crystal diodes, for example of the germanium or silicon types.

In the two modifications above described there is no actual contact of the sensing elements with the walls of the tubing. However, mechanical contact may be provided as illustrated in the modification shown in Figures 6 and 7. Here the housing is indicated at 58 and is centered by means of rollers 60. The housing mounts a series of radially slidable buttons 62 carried in insulated bushings, and urged outwardly by springs 66 which may be quite light. Under ordinary circumstances, the buttons are pushed equally inwardly by unpitted regions of the tubing walls. However, if a pit is encountered, one or more of the buttons will move abnormally outwardly. For the purpose of detecting such outward movement, and in particular the movement at any time of a button which has a maximum outward movement, the buttons are provided with electrical contact elements 70 which engage individual resistors 72 of identical type and resistance value which are arranged in parallel between terminals indicated at 76 and 78, the terminals being excited from input terminals 74 which may be supplied with either alternating or direct current of the suitable sign, in the latter case consistent with the disposition of diodes 82 which, as shown, have their anodes individually connected to the contact members 70 at 80 and which have their cathodes connected together and to the upper terminal of a capacitor 86, the other terminal of which is connected to the terminal 76. The capacitor 86 is here also shunted by a resistor 88, and provides an output at terminals 90 for the operation of a recorder of the type referred to above. It will be evident that here again the signal which appears at terminals 90 indicates the maximum penetration into a pit of one of the members 62 and, therefore, the maximum pit depth encountered at any time.

A mechanically somewhat simpler variation of what is shown in Figure 7 is illustrated in Figure 8. In Figure 7 resistors 72 are shown individually associated with the sensing contact. Electrically, of course, they are in parallel and, therefore, effectively constitute a single resistance engaged, from the standpoint of the maximum output potential, by all of the contact members 70. In Figure 8 there is actually used a single resistance engaged by all of the contact members, and this may be provided by locating on or in the insulating block 92 a spiral of fine resistance wire 94 with the convolutions insulated from each other. Such an arrangement may be provided, for example, by spirally wound fine enameled resistance wire, the upper surfaces of the convolutions being scraped free of enamel at the points of contact with the contact elements 100 corresponding to those indicated at 70 in Figure 7. The resistance wire has its terminals connected at 96 and 98 corresponding to 76 and 78. Each of the contact elements is provided with connection to an individual diode 102, the electrical circuit being, except for the differences indicated, the same as that shown in Figure 7. If the resistance wire is very fine and the convolutions very close together, there will here again be provided an indication of the position of the outermost of the sensing elements.

Still another modification of the invention involves the use of the mechanical arrangement of Figure 8 used in an electrical circuit as illustrated in Figure 9 giving rise to a system which is rather different from those previously described in not involving detection of a peak signal of a plurality of signals.

In Figure 9, the elements corresponding to those in Figure 8 are designated by the same numerals primed. The electrical connections involve grounding of the terminal 98' and of the contact elements 100', and connection of terminal 96' through a resistor 104 to one terminal 106 of a voltage supply, the other terminal 108 of which is grounded. This supply may be either direct or alternating. A recording voltmeter 110 across the resistor 104 provides the record. The voltmeter 110 could alternatively be connected between terminal 96' and ground to measure the potential drop across the non-shorted portion of the spiral resistance 94'.

As will be evident, the contact element 100' which is radially outward to a maximum extent determines, irrespective of the positions of the other contact elements 100', the effective resistance between terminal 96' and ground and, accordingly, the potential across this effective resistance or the current through resistor 104 and, therefore, the potential across it. Thus a voltmeter arranged in either of the ways discussed will provide a record which at any time furnishes a measure of the deepest pit encountered by any one of the contact elements, the reading of the voltmeter increasing with pit depth if the arrangement is that of Figure 9, or decreasing with pit depth if the alternative arrangement is used.

From the foregoing it will be evident that there is provided in accordance with the invention in any of several forms a tube calipering device which may have either no actual mechanical contact between sensing elements and the tubing walls or may have very light mechanical contact. Furthermore, in accordance with the invention, completely non-mechanical means is provided for securing an indication, for recording purposes, of the deepest pit encountered simultaneously by the sensing elements. Much of the complexities of apparatus heretofore have been involved in the matter of indication of the maximum depth of pit encountered at a particular time. In accordance with the present invention this is accomplished very simply and inexpensively by electrical means in a form which may be considered a peak voltmeter arrangement provided by diodes as described or in the form illustrated in Figure 9 in which maximum depth of a pit is electrically indicated by a short circuiting action as above described. It will be evident that various changes in details of construction may be involved without departing from the invention as defined in the following claims.

What is claimed is:

1. Tube calipering means comprising a plurality of distributed detectors and means associated therewith providing electrical signals individual to the detectors and indicative of the magnitudes of tube pits adjacent to the corresponding detectors, and means receiving all of said electrical signals and providing an indication of that signal which at any time is indicative of the tube pit of maximum magnitude.

2. Tube calipering means comprising a plurality of distributed detectors and means associated therewith providing electrical signals individual to the detectors and indicative of the magnitudes of tube pits adjacent to the corresponding detectors, and peak voltmeter means receiving all of said electrical signals and providing an indication of that signal which at any time is indicative of the tube pit of maximum magnitude.

3. Tube calipering means comprising a plurality of distributed detectors and means associated therewith providing electrical signals individual to the detectors and indicative by their magnitudes of the magnitudes of tube pits adjacent to the corresponding detectors, and means receiving all of said electrical signals and providing an indication of the maximum signal.

4. Tube calipering means comprising a plurality of distributed detectors and means associated therewith providing electrical signals individual to the detectors and indicative by their magnitudes of the magnitudes of tube pits adjacent to the corresponding detectors, and means receiving all of said electrical signals and providing an indication of the maximum signal, the last means comprising rectifying elements individual to the signals of the respective detectors and connected to a capacitance to effect charging thereof.

5. Tube calipering means comprising a plurality of distributed detectors and means associated therewith, including a source of alternating exciting current, providing electrical signals individual to the detectors and indicative of the magnitudes of tube pits adjacent to the corresponding detectors, and means receiving all of said electrical signals and providing an indication of that signal which at any time is indicative of the tube pit of maximum magnitude.

6. Tube calipering means comprising a casing adapted for movement through a tube, a plurality of detectors distributed about the casing and carried thereby, means associated with the detectors providing electrical signals individual to the detectors and indicative of the magnitudes of tube pits adjacent to the detectors, and means receiving said electrical signals and providing a record within the casing of that signal which at any time is indicative of a tube pit of maximum magnitude.

7. Tube calipering means comprising a casing adapted for movement through a tube, a plurality of detectors distributed about the casing and carried thereby, means associated with the detectors providing electrical signals individual to the detectors and indicative by their magnitudes of the magnitude of tube pits adjacent to the detectors, and means receiving said electrical signals and providing a record within the casing of the maximum signal.

8. Tube calipering means according to claim 1 in which the detectors comprise conductive elements providing variable capacitances with respect to the tube walls.

9. Tube calipering means according to claim 3 in which the detectors comprise conductive elements providing variable capacitances with respect to the tube walls.

10. Tube calipering means according to claim 6 in which the detectors comprise conductive elements providing variable capacitances with respect to the tube walls.

11. Tube calipering means according to claim 7 in which the detectors comprise conductive elements providing variable capacitances with respect to the tube walls.

12. Tube calipering means according to claim 1 in which the detectors comprise elements providing magnetic fields in and adjacent to the tube walls.

13. Tube calipering means according to claim 3 in which the detectors comprise elements providing magnetic fields in and adjacent to the tube walls.

14. Tube calipering means according to claim 6 in which the detectors comprise elements providing magnetic fields in and adjacent to the tube walls.

15. Tube calipering means according to claim 7 in which the detectors comprise elements providing magnetic fields in and adjacent to the tube walls.

16. Tube calipering means according to claim 1 in which the detectors comprise feeler members engaging the tube walls.

17. Tube calipering means according to claim 3 in which the detectors comprise feeler members engaging the tube walls.

18. Tube calipering means according to claim 6 in which the detectors comprise feeler members engaging the tube walls.

19. Tube calipering means according to claim 7 in which the detectors comprise feeler members engaging the tube walls.

References Cited in the file of this patent

UNITED STATES PATENTS

| | | |
|---|---|---|
| 2,527,170 | Williams | Oct. 24, 1950 |
| 2,622,334 | Wiley | Dec. 23, 1952 |
| 2,695,456 | Roberts | Nov. 30, 1954 |
| 2,725,486 | Walstrom | Nov. 29, 1955 |
| 2,771,685 | Kinley | Nov. 27, 1956 |

FOREIGN PATENTS

| | | |
|---|---|---|
| 898,641 | France | Apr. 27, 1945 |